Figure 1:
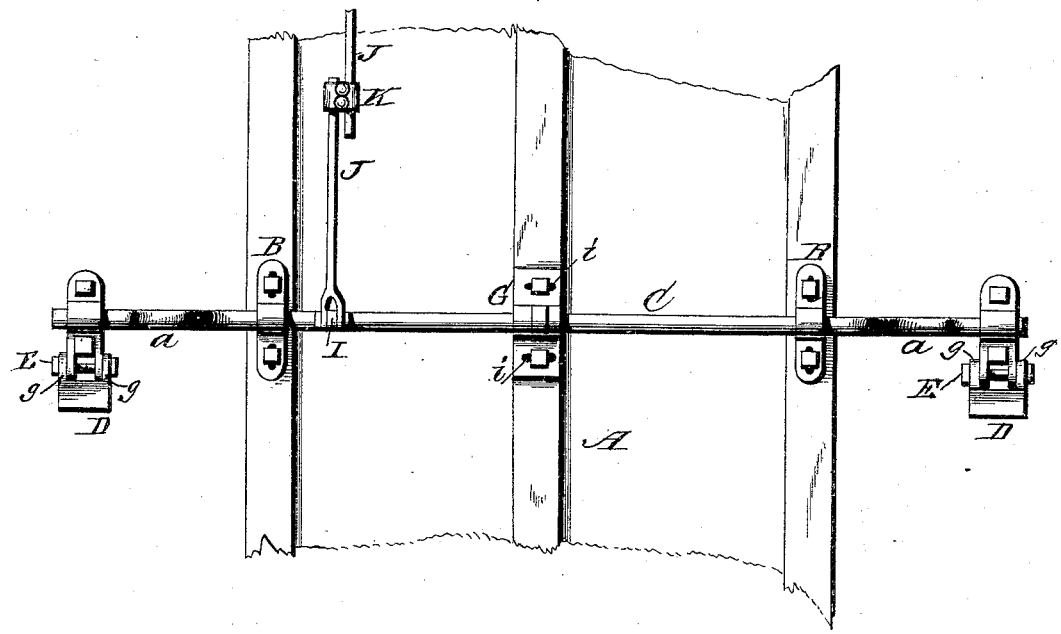

(No Model.)

G. WHITE.
BRAKE FOR VEHICLES.

No. 415,596. Patented Nov. 19, 1889.

Witnesses
Chas. J. Williamson.
E. H. Bond.

Inventor
George White.
per Chas. H. Fowler,
Attorney.

UNITED STATES PATENT OFFICE.

GEORGE WHITE, OF ROCK ISLAND, ILLINOIS.

BRAKE FOR VEHICLES.

SPECIFICATION forming part of Letters Patent No. 415,596, dated November 19, 1889.

Application filed September 23, 1889. Serial No. 324,768. (No model.)

*To all whom it may concern:*

Be it known that I, GEORGE WHITE, a citizen of the United States, residing at Rock Island, in the county of Rock Island and State of Illinois, have invented certain new and useful Improvements in Brakes for Vehicles; and I do hereby declare that the following is a full, clear, and exact description of the same, reference being had to the annexed drawings, making a part of this specification, and to the letters of reference marked thereon.

This invention relates to certain new and useful improvements in brakes for vehicles, and the novelty resides in the peculiarities of construction and the combinations, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 2:
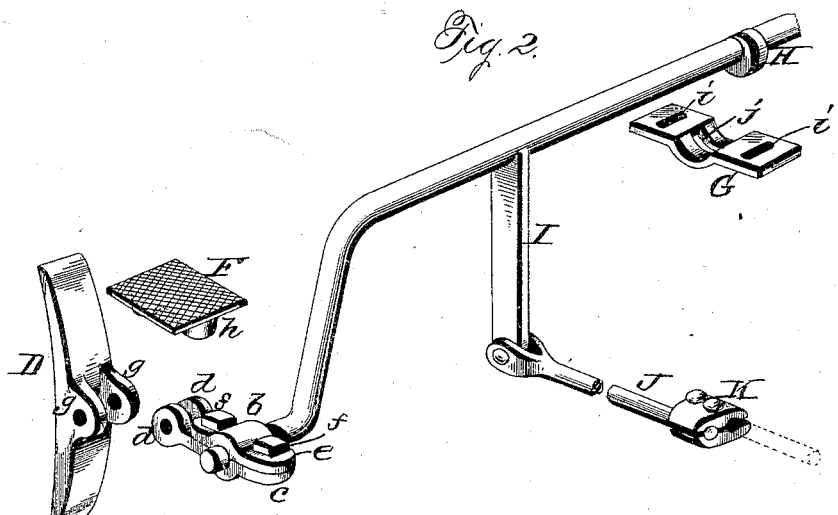

Figure 1 is a bottom plan view of a portion of a vehicle-body with my improvements attached. Fig. 2 is a perspective view of the parts composing my improvement detached and some of them separated.

Referring to the details of the drawings by letter, A designates a portion of the bottom of a vehicle of any known construction.

B are bearing-plates attached to the side sills of the body, upon the under side thereof, and provided, preferably, with elongated slotted ears through which the securing means pass, so as to render the said bearing-plates adjustable when necessary.

C is a roller-shaft having bearings in the bearing-plates B, as shown, and free to move endwise therein, except when restricted in such movement by the means hereinafter described. This shaft near its ends is provided with the bends $a$, the said ends being held in the arms $b$ or boxes, consisting of two parts, as shown best in Fig. 2, the part $c$ being formed with ears $d$, perforated, as shown, to receive a bolt, for a purpose hereinafter set forth. The top part $e$ of this box is secured to the part $c$ by means of the bolts $f$, as seen in Fig. 2.

D is the brake-shoe, provided with ears $g$, perforated, as shown best in Fig. 2, and through the perforations in these and in the ears $d$ is passed the bolt E, which serves to connect the brake-shoe to the box, the said shoe being so attached as to be free to move on the said bolt as a pivot with limited motion. The brake-shoe is curved, as shown.

F is a step which I design to sometimes apply to the shaft, and for this purpose it is formed upon its under side with bosses $h$, the said step being employed in place of the upper part $e$ of the box, the said part being removed and the step applied in its place and the two parts being secured by means of bolts or screws, which should be passed through the ears of the part $b$ into the screw-threaded bosses $h$ of the step.

G is a bearing-plate formed with ears having transverse elongated slots $i$, as seen in Figs. 1 and 2, and in its curved portion with an elongated slot $j$, extending at right angles to the slots $i$. On the shaft C, near its center, there is formed integral or rigidly secured thereto a cam-collar H, which is designed to engage and work in the elongated slot $j$ of the plate G. This cam-collar is for the purpose of holding the roller-shaft in its proper place, and as it often happens that the vehicle-body is not in the center between the wheels the shaft has to be adjusted lengthwise to bring the brake-shoes in their proper positions in relation to the wheels. The slotted plate G is for the purpose of accomplishing this. The plate is adjusted to the right or left until the shoes are in the desired position, when the nuts on the bolts which secure it to the bottom of the body are tightened and the parts held in their adjusted position.

I is a lever or arm rigid on the shaft C, near one end thereof, and J is the connecting-rod, which I prefer to make in two parts, adjustable in length, as shown. Each part has a bifurcated end, the end of one being pivotally connected with the arm I, as shown in Fig. 2, and the bifurcated end of the other part being designed to be suitably connected with the brake-operating lever. (Not shown.) The adjacent ends of the two parts of the connecting-rod are connected by means of the clip-irons K, the adjacent faces of which are provided with depressions and held together by means of bolts, as shown in Fig. 2, the loosening of which will allow the connecting-rod to be adjusted as desired. By this arrangement the connecting-rod can be adjusted to suit varying forms of vehicles, and by adjusting the parts of the box *b* the shoes can be moved nearer to or farther from each other, as may be necessary.

What I claim as new is—

1. The combination, with the body and the bearings for the shaft, of the cam-collar on the shaft and the adjustable bearing-plate having a slot for the passage of said collar, substantially as shown and described.

2. The combination, with the shaft carrying at its ends the brake-shoes and provided at its center with a cam-collar, of the bearing-plate G, having transverse elongated slots and a slot at right angles thereto for the reception of said collar, substantially as and for the purpose specified.

3. The combination, with the shaft and the arm thereon, of the two-part connecting-rod having one part pivotally attached to said arm and the clamping-plates adjustably connecting the adjacent ends of the two parts of the said rod, as set forth.

4. The combination, with the shaft and the adjustable boxes thereon, of the brake-shoe pivotally connected to one part of the adjustable box, substantially as described.

5. The combination, with the shaft and the two-part box, of the step having bosses, as shown, and designed to be employed in lieu of the upper part of the box, substantially as described.

6. The combination, with the shaft and the two-part box at one end thereof, the under part being provided with ears *d*, of the step provided upon its under side with bosses screw-threaded and designed to be used in lieu of the upper part of the box, substantially as described.

In testimony that I claim the above I have hereunto subscribed my name in the presence of two witnesses.

GEORGE WHITE.

Witnesses:
H. C. FIEST,
E. PETERSON.